United States Patent [19]

Okuda et al.

[11] Patent Number: 4,625,576

[45] Date of Patent: Dec. 2, 1986

[54] SHIFT CONTROL MECHANISM OF AUTOMOTIVE MANUAL TRANSMISSION

[75] Inventors: Michihiro Okuda, Zama; Kotei Takahashi, Sagamihara, both of Japan

[73] Assignee: Nissan Motor Co., Ltd., Yokohama, Japan

[21] Appl. No.: 658,216

[22] Filed: Oct. 5, 1984

[30] Foreign Application Priority Data

Oct. 7, 1983 [JP] Japan .................... 58-187788

[51] Int. Cl.$^4$ .................... G05G 9/12; G05G 5/10
[52] U.S. Cl. .................... 74/473 R; 74/477
[58] Field of Search .................... 74/473 R, 475, 476, 74/477, 473 P

[56] References Cited

U.S. PATENT DOCUMENTS

| 2,593,297 | 4/1952 | Gregoire | 74/476 |
| 3,431,791 | 3/1969 | Labat | 74/477 |
| 3,550,467 | 12/1970 | Forichon | 74/473 R |
| 4,304,144 | 12/1981 | Takahashi | 74/475 |
| 4,381,682 | 5/1983 | Kudo et al. | 74/473 R X |

FOREIGN PATENT DOCUMENTS

| 0058963 | 9/1982 | European Pat. Off. |
| 0058965 | 9/1982 | European Pat. Off. |
| 0058966 | 9/1982 | European Pat. Off. |
| 2215286 | 10/1973 | Fed. Rep. of Germany |
| 3016909 | 11/1981 | Fed. Rep. of Germany |
| 57-139830 | 8/1982 | Japan |
| 775138 | 5/1957 | United Kingdom |
| 1178944 | 1/1970 | United Kingdom |
| 1274334 | 5/1972 | United Kingdom |

Primary Examiner—Allan D. Herrmann
Attorney, Agent, or Firm—Schwartz, Jeffery, Schwaab, Mack, Blumenthal & Evans

[57] ABSTRACT

Herein disclosed is an improved direction changing mechanism used in a shift control mechanism of a transverse manual transmission. The direction changing mechanism comprises a drive member movable together with the control rod; and at least one driven member movable together with the shift fork. The driven member is formed with a rectangular recess into which a head portion of the drive member is insertable under a certain condition so that upon selecting operation, the head portion of the drive member is put in the recess of the driven member and upon shifting operation, the head portion of the drive member abuts against one of the side walls of the recess thereby to move the driven member in a certain direction thereby completing a gear coupling. The head portion of the drive member is so sized and constructed that when the drive member assumes its rest or neutral position, the head portion is spacedly put in the recess without contacting the driven member, while, when the drive member assumes its operative position to complete the gear coupling, the head portion contact both the side walls of the recess.

10 Claims, 19 Drawing Figures

SHIFT CONTROL MECHANISM OF AUTOMOTIVE MANUAL TRANSMISSION

BACKGROUND OF THE INVENTION

1. Field of the Invention

The present invention relates in general to a shift control mechanism of an automotive manual transmission, and particularly to a shift control mechanism of a transversely mounted manual transmission which is particularly adaptable for use in a F.F (front engine front drive) type automotive vehicle having a transversely mounted engine.

2. Description of the Prior Art

In the transmissions of the type mentioned above, the shift control mechanism is usually so arranged that a control rod actuated by the manual shift lever in the vehicle cabin extends perpendicular to the axis of the fork shaft on and along which shift forks slide. Thus, a so-called "direction changing mechanism" is arranged between the control rod and the shift forks, which functions to convert the axial movement of the control rod to a sliding movement of selected one of the shift forks along the fork shaft. One of the direction changing mechanisms is disclosed in Japanese Patent Application First Publication No. 57-139830 which was laid open Aug. 30, 1982. The mechanism disclosed comprises generally a plurality of L-shaped pivoting levers which are pivotally mounted on a common pin secured to the housing of the transmission, one end of each pivoting lever being articulated with an extension of the corresponding shift fork and the other end of the same being formed with a rectangular recess into which a head portion of a shift arm secured to the control rod is selectively insertable to form an articulated connection therebetween. Upon selecting operation of the manual shift lever, the head portion of the shift arm is rotated together with the control rod travelling the path defined by the aligned recesses of the pivoting levers and stops in one of the recesses, and upon shifting operation of the manual shift lever after the selecting operation, the head portion of the shift arm is moved axially together with the control rod thereby pivoting the selected pivoting lever. With this, the associated shift fork is moved to a certain coupling position thereby to establish a certain gear ratio.

In the known direction changing mechanisms of the type mentioned above, however, the selecting movement of the head portion of the shift arm in the path of the aligned recesses and the shifting movement of the head portion in the selected recess have sometimes caused troublesome or uncomfortable manipulation of the manual shift lever by the operator (driver). Some of the known direction changing mechanisms will be briefly described in the last paragraph of the specification with their undesirable phenomena. Inventors have revealed that these undesirable phenomena originate from the inherent construction of the head portion of the shift arm and that of the recess of each pivoting lever.

SUMMARY OF THE INVENTION

It is therefore an object of the present invention to provide a shift control mechanism for a transversely mounted transmission, which is equipped with an improved direction changing mechanism which is free of the above-mentioned drawback.

According to the present invention, there is provided an improved direction changing mechanism in a shift control mechanism of a manual transmission having a control rod which is movable in response to both selecting and shifting operations of a manual shift lever, and at least one shift fork which is movable to achieve a gear coupling. The mechanism comprises a drive member movable together with the control rod; at least one driven member movable together with the shift fork, the driven member being formed with a recess into which the drive member is insertable under a certain condition so that upon the selecting operation, the drive member is put in the recess of the driven member, and upon the shifting operation, the drive member abuts against one of side walls of the recess thereby to move the driven member in a certain direction; and means for permitting, when the drive member assumes its rest or neutral position, the drive member to be spacedly put in the recess without contacting the driven member, and permitting, when the drive member assumes its operative position to complete a certain gear change operation, the drive member to contact both the side walls of the recess.

BRIEF DESCRIPTION OF THE DRAWINGS

Other objects and advantages of the present invention will be apparent from the following description when taken in conjunction with the accompanying drawings, in which.

DESCRIPTION OF A TRANSVERSE MANUAL TRANSMISSION

Prior to describing in detail the invention, a transverse manual transmission to which the present invention is practically applied will be described with reference to the drawings.

Figure 4:
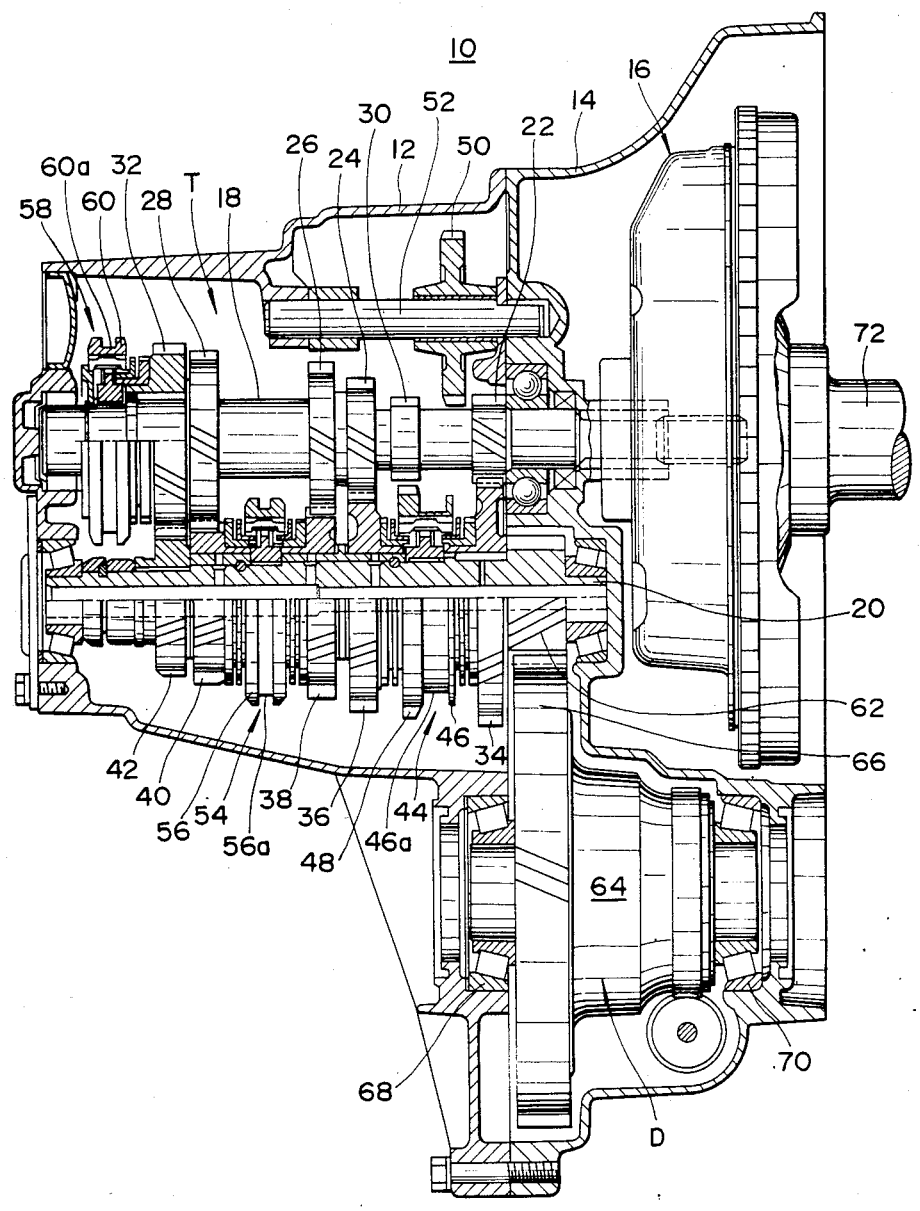
FIG. 4 is a longitudinally sectional view of a transversely mounted manual transmission equipped with a shift control mechanism of a first embodiment of the present invention, some parts being shown dislocated from their proper positions for clarification of the drawing.

Referring to FIGS. 4 to 10, particularly FIG. 4, there is shown a transaxle assembly 10 adapted for use in a F.F (front engine front drive) type motor vehicle having a transversely mounted engine, in which assembly a shift control mechanism according to the present invention is assembled. The transaxle assembly 10 is a single unit including a transmission T and a differential gear D.

The transaxle assembly 10 comprises housings 12 and 14 which are united to mount therein gear trains of the transmission T as well as gears of the differential D. The housing 14 also acts as a housing for a clutch 16.

Within the housing 12, there are parallelly arranged an input shaft 18 and an output shaft 20 which are rotatable about the respective axes thereof relative to the housing. The input shaft 18 is adapted to receive torque from the engine through the clutch 16. Defined by or secured to the input shaft 18 are a first speed input gear 22, a second speed input gear 24, a third speed input gear 26, a fourth speed input gear 28 and a reverse input gear 30. A fifth speed input gear 32 is journalled on the input shaft 18. Journalled on the output shaft 20 are a first speed output gear 34, a second speed output gear 36, a third speed output gear 38 and a fourth speed output gear 40 which are constantly meshed with the first, second, third and fourth speed input gears 22, 24, 26 and 28, respectively. A fifth speed output gear 42 is splined to the output shaft 20 and constantly meshed with the fifth speed input gear 32.

A first-second synchronizing clutch mechanism 44 is slidably supported on the output shaft 20, which functions to smoothly connect either the first speed output gear 34 or the second speed output gear 36 to the output shaft 20 thereby to establish the first or second forward gear ratio. A coupling sleeve 46 of the mechainsm 44 is formed at its periphery with a reverse idler gear 48 which is meshingly engageable with the reverse input gear 39 through a reverse idler gear 50 (which is shown dislocated in FIG. 1 for clarification of the drawing). The reverse idler gear 50 is rotatably and axially slidably mounted on a stationary shaft 52 which is parallel with the input and output shafts 18 and 20.

A similar third-fourth synchronizing clutch mechanism 54 is slidably supported on the output shaft 20, which functions to smoothly connect either the third speed output gear 38 or the fourth speed output gear 40 to the output shaft 20 thereby to establish the third or fourth forward gear ratio. Designated by numeral 56 is a coupling sleeve of the mechanism 54 which is shiftable rightward and leftward in FIG. 4.

A fifth synchronizing clutch mechanism 58 is slidably supported on the input shaft 18 for smoothly connecting the fifth speed input gear 32 to the input shaft 18 thereby to establish the fifth forward gear ratio. In particular, when a coupling sleeve 60 of this mechanism 58 is shifted rightward in FIG. 4, the fifth speed input gear 32 meshing with the fifth speed output gear 42 becomes into driving connection with the input shaft 18.

A drive pinion 62 is defined by or secured to the output shaft 20. The drive pinion 62 meshes with a ring gear 66 secured to a casing 64 of the differential gear D thereby to constitute a final drive mechanism. The differential gear casing 64 is rotatably supported at its axial both ends by the housings 12 and 14 through thrust bearings 68 and 70 which are mounted in the housings 12 and 14, respectively. Although not shown in the drawing, a pair of road wheel driving shafts are inserted at their inside ends into the casing 64 from the axial ends of the casing and respectively engaged with side gears (not shown) of the differential gear D.

In the above-described construction, the engine output which is transmitted from an engine crank shaft 72 to the input shaft 18 through the clutch 16 rotates the first, second, third and fourth speed output gears 34, 36, 38 and 40 through the first, second, third and fourth speed input gears 22, 24, 26 and 28. However, as far as the coupling sleeves 46, 56 and 60 and the reverse idler gear 50 assume the respective rest positions as shown in FIG. 4, the engine power is not transmitted to the output shaft 20 thereby keeping the transmission T in a neutral condition.

When the coupling sleeve 46 is shifted rightward in FIG. 4, the first speed output gear 34 meshing with the first speed input gear 22 becomes into driving connection with the output shaft 20, so that the engine power is transmitted to the driving wheels (not shown) through the first speed input gear 22, the first speed output gear 34, the drive pinion 62, the ring gear 66 and the differential gear D thereby to establish a first forward gear ratio. Similar to this, when the coupling sleeve 46 is shifted leftward, a second forward gear ratio is established.

When the coupling sleeve 56 is shifted rightward in FIG. 4, the third speed output gear 38 meshing with the third speed input gear 26 becomes into driving connection with the output shaft 20 thereby to establish a third forward gear ratio, while, when the coupling sleeve 56 is shifted leftward, the fourth speed output gear 40 meshing with the fourth speed input gear 28 becomes into driving connection with the output shaft 20 thereby to establish a fourth forward gear ratio.

When the coupling sleeve 60 is shifted rightward in FIG. 4, the fifth speed input gear 32 meshing with the fifth speed output gear 42 becomes into driving connection with the input shaft 18 to be rotatable therewith, so that the engine power is transmitted to the driving wheels through the fifth speed input gear 32, the fifth speed output gear 42 splined to the output shaft 20, the drive pinion 62, the ring gear 66 and the differential gear D thereby to establish a fifth forward gear ratio.

When the reverse idler gear 50 is shifted leftward in FIG. 4 to engage with both the reverse input gear 30 and the reverse output gear 48, the engine power is transmitted to the driving wheels through the reverse input gear 30, the reverse idler gear 50, the reverse output gear 48, the drive pinion 62, the ring gear 66 and the differential gear D thereby to establish a reverse condition.

DESCRIPTION OF THE FIRST EMBODIMENT

The shift control mechanism of the first embodiment of the present invention, which conducts the abovementioned operation, will be described hereinnext.

Figure 5:
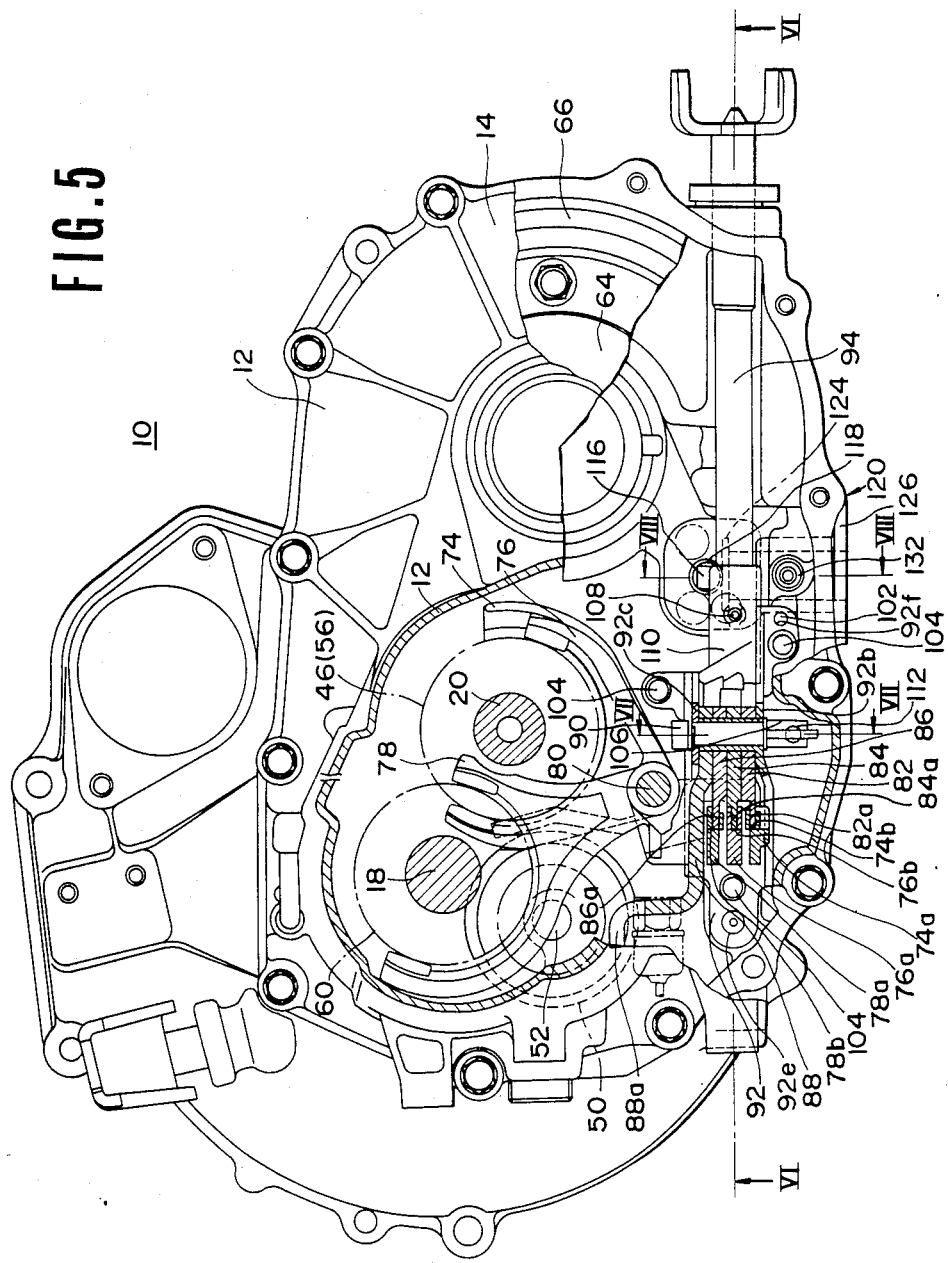
FIG. 5 is a transversely sectional view of the transmission at the position where the shift control mechanism of the present invention is located.

As is best seen from FIG. 5, a common shift fork shaft 80 is arranged in the housing to extend parallel with the input and output shafts 18 and 20. Three shift forks 74, 76 and 78 constructed of light metal, for example, aluminium are slidably mounted at their hub sections on the common fork shaft 80 in this order, as is best seen from FIG. 10. The shift forks 74, 76 and 78 are operatively engaged with the annular grooves 46a, 56a and 60a (see FIG. 4) of the coupling sleeves 46, 56 and 60, respectively, for shifting these coupling sleeves rightward or leftward in FIG. 4. As is best seen from FIG. 10, the shift forks 74, 76 and 78 are respectively formed with extensions 74a, 76c, 78a. The extensions 76a and 78a extend along the fork shaft 80 in the same direction, while, the extension 74a extends perpendicular to the fork shaft 80 and straddles the leading ends of the extensions 76a and 78a and curves upward in FIG. 10. As will be understood from FIGS. 5 and 10, the extension 76a is placed between the extension 74a and the extension 78a. For the reason which will become clear hereinafter, the extensions 74a, 76a and 78a are respectively formed at their leading ends with recesses 74b, 76b and 78b which face toward the same direction, that is, toward a direction changing mechanism. As is described hereinnext, the direction changing mechanism functions to transmit the axial motion of a manually operated control rod 94 to selected one of the shift forks 74, 76 and 78 converting the direction of work, thereby shifting the corresponding coupling sleeve 46, 56 or 60 in the above-mentioned manner.

The direction changing mechanism comprises generally L-shaped first, second, third and fourth pivoting levers 82, 84, 86 and 88 which have substantially equal thickness and are pivotally mounted on a common pin 90 in this order so as to be pivotal about the axis of the pin 90. The first, second and third pivoting levers 82, 84 and 86 are identical in shape. The pin 90 is arranged normal to the axis of the common shift fork shaft 80. The first, second and third pivoting levers 82, 84 and 86 are respectively formed with first arm portions 82a, 84a and 86a which are respectively and jointly received in the afore-mentioned recesses 74b, 76b and 78b of the shift fork extensions 74a, 76a and 78a to form therewith respective articulated connections. The leading ends 82c, 84c and 86c of the first arm portions 82a, 84a and 86a are equipped with caps 150 (see FIGS. 6) of sintered alloy or suitable plastics for effecting abrasion protection.

Figure 6:
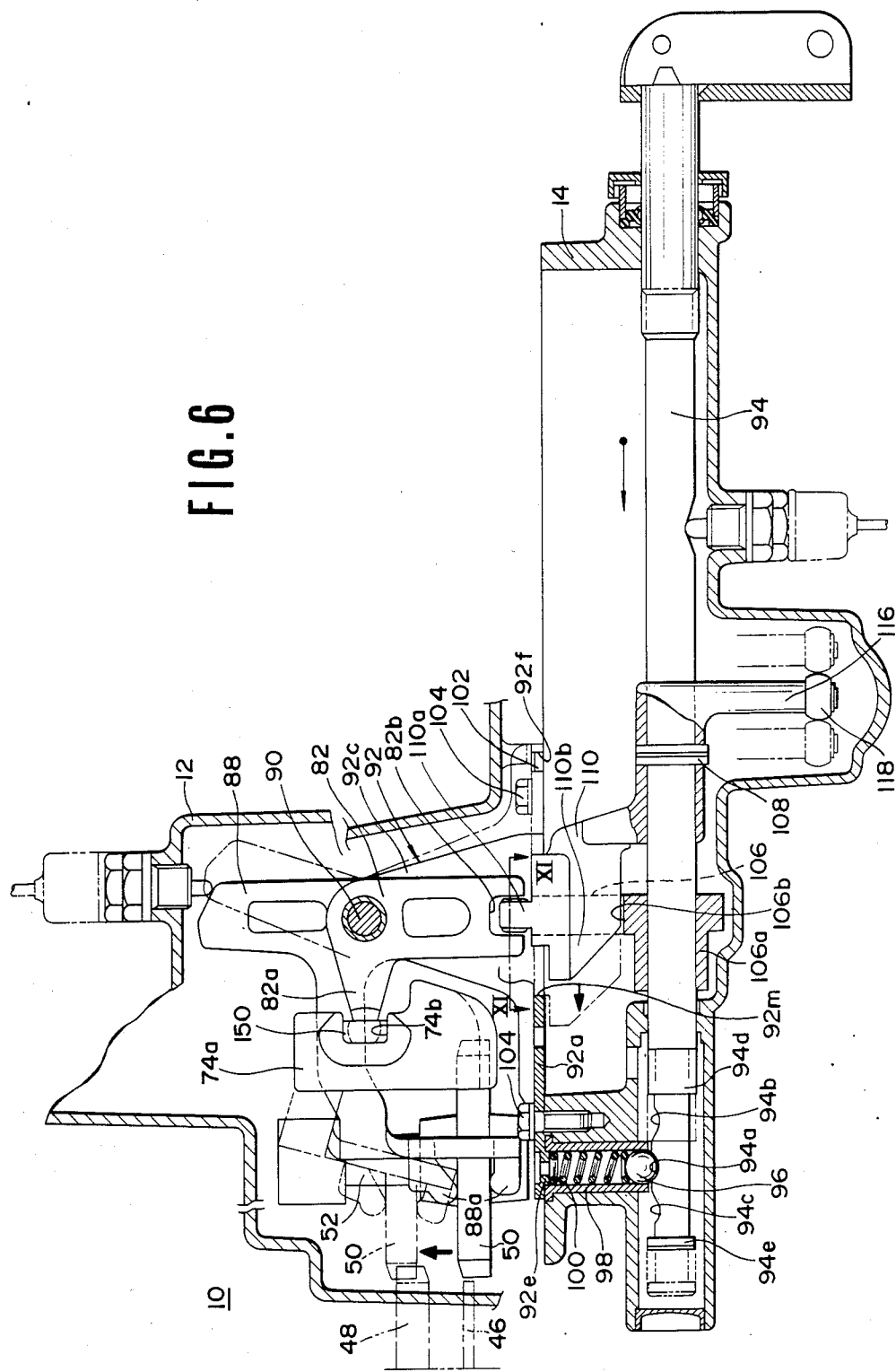
FIG. 6 is a sectional view taken along the line VI—VI of FIG. 5.

As is seen from FIG. 6, the fourth pivoting lever 88 has an elongate extension 88a which is bifurcated straddling the reverse idler gear 50.

The unit consisting of the first, second, third and fourth pivoting levers 82, 84, 86 and 88 and the common pin 90 is housed in a supporting member or generally U-shaped bracket 92 which is bolted to the housing 14. As is understood from FIGS. 5 and 9, the common pin 90 passes through aligned holes 92d respectively formed in spaced side walls 92b and 92c of the bracket 92. The bottom wall 92a of the bracket 92 is formed at spaced sections thereof with three holes (no numerals) through which after-mentioned three bolts 104 are respectively passed. The bottom wall 92a of the bracket 92 is further formed at its outer surface with a circular projection 92e, and a positioning hole 92f. As will be understood from FIG. 5, the bracket 92 is secured to the housing 14 by three bolts 104 passing through the three holes of the bracket bottom wall 92a and is arranged so that the first, second, third and fourth pivoting levers 82, 84, 86 and 88 are pivotable about the common pin 90 along respective planes parallel to the axis of the common fork shaft 80. As is seen from FIGS. 5 and 6, securing the bracket 92 to the housing 14 is so made that the circular projection 92e of the bottom wall 92a is received in one open end of an after-mentioned sleeve 98 and that the positioning hole 92f of the bottom wall 92a receives therein a positioning pin 102 secured to the housing 14.

As is seen from FIGS. 5 and 6, a control rod 94 is arranged in the housing 14 in such a manner that the axis thereof is normal to the axis of the common fork shaft 80. The control rod 94 is rotatable about the axis thereof and slidable along the axis thereof. One end of the control rod 94 is projected outwardly from the housing 14 and connected through a suitable linkage to a conventional manual shift lever (not shown) located in a vehicle cabin. It is to be noted that the selecting operation of the manual shift lever induces rotation of the control rod 94 about the axis thereof and the shifting operation of the manual shift lever induces sliding movement of the control rod 94 along the axis thereof. As is seen from FIG. 6, the control rod 94 is formed at its inwardly leading end portion with three axially spaced notches 94a, 94b and 94c. A detent ball 96 is slidably received in the afore-mentioned sleeve 98 which is tightly received in a bore (no numeral) formed in the housing 14. A spring 100 is received in the sleeve 98 to bias the detent ball 96 toward the control rod 94. Thus, it will be appreciated that the longitudinal movement of the control rod 94 (that is, the shifting operation of the manual shift lever) is carried out with "detent feeling".

As is understood from FIG. 6, the pivoting levers 82, 84, 86 and 88 are of a bell crank type, and they have at the leading ends of the second arm portions thereof respective rectangular recesses 82b, 94b, 86b and 88b, the recesses being aligned when all pivoting levers 82, 84, 86 and 88 are in their neutral or rest positions.

The configuration of each rectangular recess 82b, 84b, 86b or 88b will be described in detail hereinafter in the section of "DETAILED DESCRIPTION OF THE FIRST EMBODIMENT" because it is directly concerned with the present invention.

An interlock device is provided to ensure that only one pivoting lever 82, 84, 86 or 88 is moved at any given time. A generally sectorial interlock plate 106 is rotatably disposed at its hub section 106a on the control rod 94 with its arcuate free end section slidably received in the aligned recesses 82b, 84b, 86b and 88b of the pivoting levers. As will be understood from FIGS. 7 to 10, the sectorial section of the interlock plate 106 is put between two lug portions 92g and 92h (see FIGS. 9 and 10) of the bracket 92 so as to restrain the axial movement of the interlock plate 106 along the control rod 94. As is seen from FIG. 7, the interlock plate 106 is formed with a stepped recess 106b which leads to the arcuate free end section thereof. The width of the mouth portion of the recess 106b is equal to or less than the thickness of the major portion of each pivoting lever. As is seen from FIG. 7, a blind hole 106c is formed in the interlock plate 106, which extends toward the hub section 106a.

As is seen from FIG. 6, a shift arm 110 is secured at its hub section to the control rod 94 by means of a connecting pin 108 to move therewith. The shift arm 110 has a shank portion 110b which extends along the control rod 94 leaving a space therebetween. The shank portion 110b is slidably received in the afore-mentioned stepped recess 106b of the interlock plate 106. Thus, it will be appreciated that rotation of the shift arm 110 with the control rod 94 about the axis of the rod 94 induces a simultaneous rotation of the interlock plate 106, and that axial movement of the shift arm 110 with the control rod 94 does not induce the axial movement of the interlock plate 106. The shank portion 110b of the shift arm 110 is formed with a head portion 110a which projects radially outwardly but slightly from the mouth of the stepped recess 106b of the interlock plate 106, as is seen from FIG. 7, so as to be received in one of the afore-mentioned rectangular recesses 82b, 84b, 86b and 88b of the pivoting levers 82, 84, 86 and 88.

The detailed configuration of the head portion 110a of the shift arm 110 will be described hereinafter in the section of "DETAILED DESCRIPTION OF THE FIRST EMBODIMENT" because it is directly concerned with the present invention.

Figure 7:
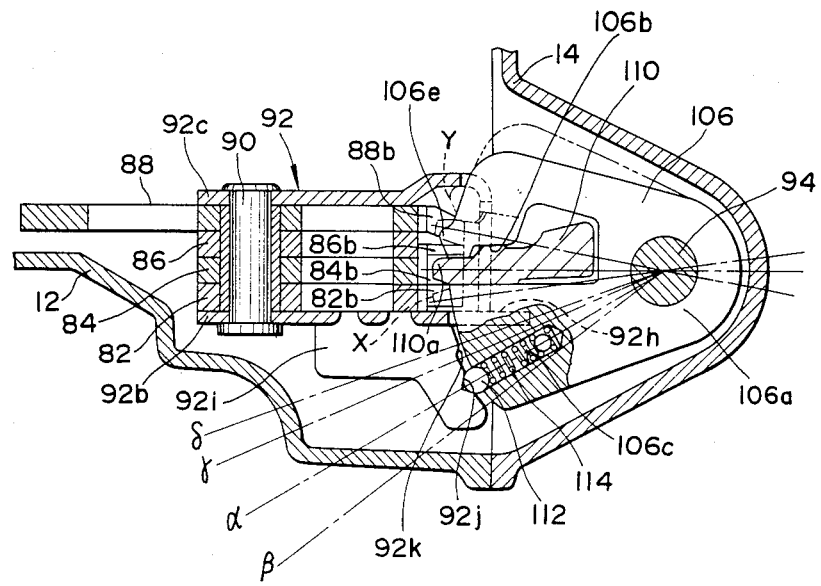
FIG. 7 is a sectional view taken along the line VII—VII of FIG. 5.

As is seen from FIG. 7, a detent ball 112 is slidably received in the blind hole 106c of the interlock plate 106. A spring 114 is received in the hole 106c to bias the ball 112 toward a notched plate 92i secured to the bracket 92 in a manner as is shown in FIG. 7. The arrangement of the notched plate 92i relative to the bracket 92 may be understood from FIGS. 7 and 9. As is seen from these drawings, the notched plate 92i is formed with a notch 92i and a step 92k with which the detent ball 112 is engageable. With the detent ball 112 engaged with the notch 92j, the interlock plate 106 is restrained in a desired angular position. With this arrangement, a so-called select detent mechanism is provided, which gives the driver "detent feeling" when he or she carries out the selecting operation with the manual shift lever.

As is seen in FIG. 7, the interlock plate 106 is formed, at the arcuate free end section near the mouth of the recess 106b, with a projection 106e which serves to limit rotation of the interlock plate 106 about the control rod 94 as will become clear hereinafter.

As is seen from FIG. 6, the shift arm 110 is formed, at a side opposite to the shank portion 110b, with another arm 116 the leading end of which is equipped with a roller 118 which is a part of a next-mentioned select return mechanism which functions to impose the manual shift lever operator (driver) a slightly greater effort to move the shift lever when he or she selects the fifth forward speed position or the reverse position. As is seen from FIG. 8, the roller 118 is associated with a biasing unit 120. The unit 120 comprises a holder 122 secured to the housing 14. A piston 124 having a flat head is slidably received in the holder 122 and a spring 126 is received in the holder 122 to bias the piston 124 to abut against the roller 118. Designated by numeral 128 is a stopper pin which is secured to the holder 122 and projected into an axially extending recess 124c of the piston 124 for limiting the movement of the piston 124. The piston 124 is formed at its cylindrical outer side with another axially extending recess 124a which opens to a hole 122a formed in the holder 122. A detent ball 130 is slidably received in the hole 122a in a manner to be partially projected into the recess 124a. The ball 130 is biased toward the recess 124a by means of a spring 134 and another ball 136 which are received in a hole 14a defined by the housing 14, the hole 14a being plugged with a bolt 132.

In the following, operation will be described.

Figure 15:
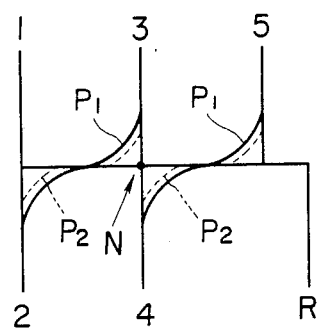
FIG. 15 is a shift pattern described by a manual shift lever incorporated with the shift control mechanism of the first embodiment.

In order to facilitate the description, it will be commenced with respect to a condition wherein the manual shift lever is at the neutral position N (see FIG. 15), that is, the control rod 94 is in a neutral position with respect to both the selecting (rotating) and shifting (sliding) movements thereof, as is shown by FIGS. 5 to 8. In this condition, the detent ball 112 (see FIG. 7) carried by the interlock plate 106 is engaged with the notch 92j of the plate 92i to restrain the control rod 94 in an angularly settled position, and the arm 116 (see FIG. 8) of the select return mechanism takes a position indicated by solid line wherein the roller 118 engages the piston head 124 which assumes its uppermost position. Further, in this condition, the head portion 110a of the shift arm 110 is engaged with the recess 84b of the second pivoting lever 84, and as is seen from FIG. 6, the detent ball 96 is engaged with the center notch 94a of the control rod 94 to restrain the control rod 94 in a longitudinally settled position. Furthermore, in this condition, the coupling sleeves 46, 56 and 60 and the reverse idler gear 50 take the corresponding positions as shown by FIG. 4, so that the engine power is not transmitted to the differential gear D thereby holding the vehicle in a halt. (Thus, as will be understood as the description proceeds, in this neutral condition, the control rod 94 is in a temporary (or "stand by") position for the third or fourth forward gear ratio.)

Figure 8:
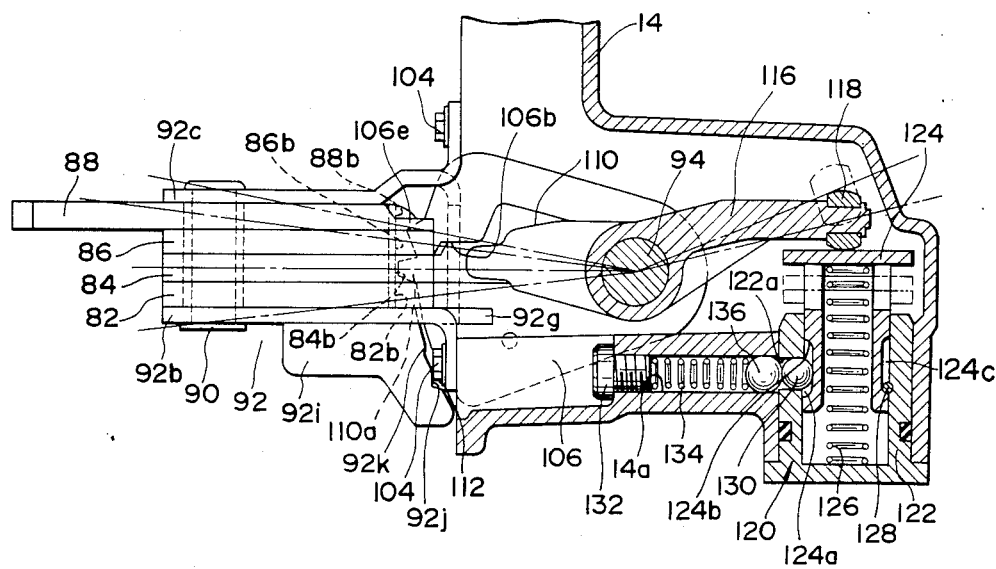
FIG. 8 is a sectional view taken along the line VIII—VIII of FIG. 5.
Figure 9:
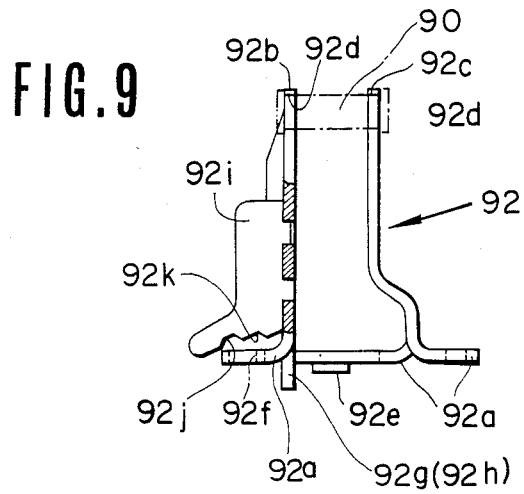
FIG. 9 is a partially broken front view of a bracket used for mounting pivoting levers thereon.
Figure 10:
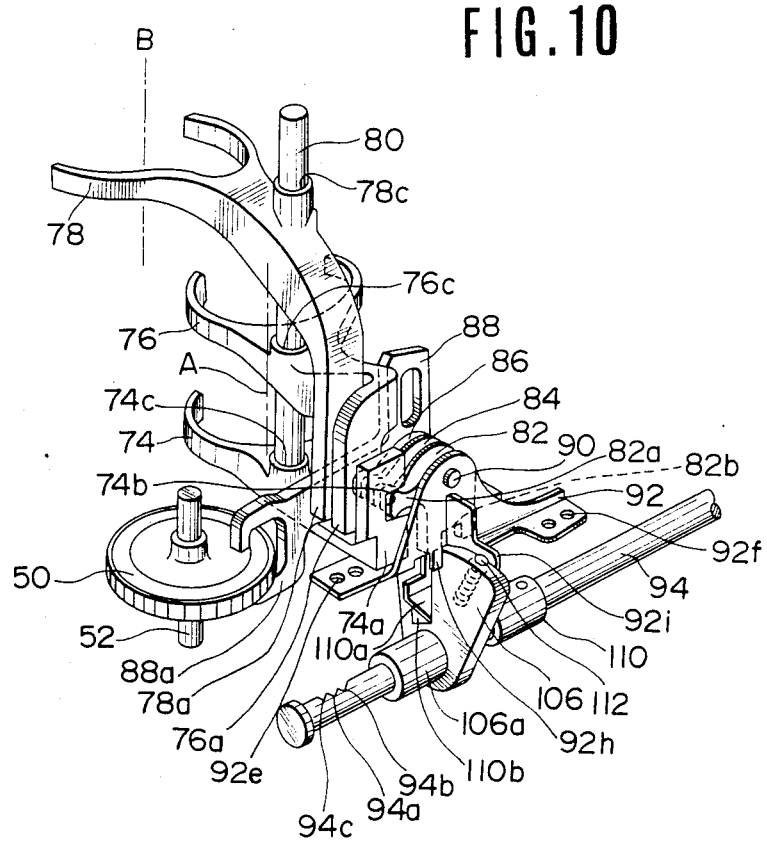
FIG. 10 is a perspective view of the shift control mechanism to which the present invention is applied.

When, in response to a first speed selecting operation of the manual shift lever, the control rod 94 is rotated about its axis in a counterclockwise direction in FIGS. 7 and 8, the shift arm 110 which rotates together with the rod 94 brings about a counterclockwise rotation of the interlock plate 106 moving the detent ball 112 from a position on the line α (see FIG. 7) to a position on the line β. During this operation, detent feeling is given because the detent ball 112 is pushed against the biasing force of the spring 114, and when the head portion 110a of the shift arm 110 comes to a position indicated by broken line X in FIG. 7 and contacts a portion of the bracket 92, the operator (driver) can recognize that the control rod 94 has come to a temporary (or "stand by") position for the first or second forward gear ratio, in which position the head portion 110a is received in the rectangular recess 82b of the first pivoting lever 82. When then the control rod 94 is axially moved in the rightward direction in FIGS. 5 and 6 in response to a subsequent shifting operation of the manual shift lever, the first pivoting lever 82 is rotated about the pin 90 in a counterclockwise direction in FIG. 6 thereby shifting by the shift fork 74 the coupling sleeve 46 in the rightward direction in FIG. 4. Thus, as has been mentioned hereinafore, the first forward gear ratio is established. While, when the control rod 94 in the temporary (or "stand by") position is axially moved in the leftward direction in FIGS. 5 and 6, the pivoting lever 82 is rotated in a clockwise direction in FIG. 6 thereby shifting the coupling sleeve 46 in the leftward direction in FIG. 4. Thus, in this case, the second forward gear ratio is established.

During the above-mentioned operation, the detent ball 96 (see FIG. 6) is forced to move from the center notch 94a to the notch 94c or the notch 94b compressing the spring 100. Thus, detent feeling is produced.

When the control rod 94 rest in the afore-mentioned neutral position is axially moved in the rightward direction in FIGS. 5 and 6 in response to a shifting operation of the manual shift lever, the second pivoting lever 84 is rotated about the pin 90 in a counterclockwise direction in FIG. 6 thereby shifting, by the shift fork 76, the coupling sleeve 56 in the rightward direction in FIG. 4. Thus, the third forward gear ratio is established as has been described hereinafore. When the control rod 94 in the neutral position is axially moved in the leftward direction in FIGS. 5 and 6, the second pivoting lever 84 is rotated in a clockwise direction in FIG. 6 thereby shifting the coupling sleeve 56 in the leftward direction in FIG. 4. Thus, the fourth forward gear ratio is established.

During these shifting operations, detent feeling is also given by the spring-biased detent ball 96, like the case of the above-mentioned operation to the first or second forward gear ratio.

When the control rod 94 rest in the neutral position is rotated about the axis thereof in a clockwise direction in FIGS. 7 and 8 in response to fifth speed selecting operation of the manual shift lever, the shift arm 110 which rotates together with the rod 94 brings about a clockwise rotation of the interlock plate 106 moving the detent ball 112 from the position on the line α (see FIG. 7) to a position on the line γ. During this operation, a detent feeling is produced because the detent ball 112 is pushed against the biasing force of the spring 114 and brought into contact with the step 92k of the notched plate 92i. During this operation, the other arm 116 (see FIG. 8) extending from the shift arm 110 is rotated about the axis of the control rod 94 in a clockwise direction in FIG. 8 pushing via the roller 118 the piston 124 against the force of the spring 126 into a position wherein one end 124b of the groove 124a of the piston 124 contacts the detent ball 130. This operation also gives a detent feeling to the operator. When the detent feeling is given, the operator (driver) can recognize that the head portion 110a of the shift arm 110 has come to a temporary (or "stand by") position for the fifth forward gear ratio where the head portion 110a is received in the recess 86b of the third pivoting lever 86. When, then, the control rod 94 is axially moved in the rightward direction in FIGS. 5 and 6 in response to a subsequent shifting operation of the manual shift lever, the third pivoting lever 86 is rotated about the pin 90 in a counterclockwise direction in FIG. 6 thereby moving, by the shift fork 78, the coupling sleeve 60 in the rightward direction in FIG. 4. Thus, the fifth forward gear ratio is established.

During this shifting operation, a detent feeling is produced by a fact that the detent ball 96 is forced to move from the notch 94a to the notch 94c against the biasing force of the spring 100.

When, in response to a reverse selecting operation of the manual shift lever, the control rod 94 rest in the neutral position is rotated a greater degree about the axis thereof in a clockwise direction in FIGS. 7 and 8 exceeding the temporary (or "stand by") position for the fifth forward gear ratio, the detent ball 112 carried by the interlock plate 106 is moved from the position on the line α to the position on the line δ riding over the step 92k (see FIG. 7). During this operation, the other arm 116 (see FIG. 8) of the shift arm 110 is largely rotated about the axis of the control rod 94 in a clockwise direction in FIG. 8 pushing via the roller 118 the piston 124 against the force of the spring 126 to such a degree as to cause the detent ball 130 to ride over the end 124b of the recess 124a. Thus, during this operation, a detent feeling is produced so that the operator (driver) can recognize that the head portion 110a of the shift arm 110 has passed the temporary position for the fifth forward gear ratio. When the control rod 94 is still further rotated in the same direciton, the projection 106e of the interlock plate 106 comes to a position indicated by a phantom line Y in FIG. 7 and finally contacts another portion of the bracket 92. With this contact, the operator (driver) can recognize that the head portion 110a of the shift arm 110 has come to a temporary (or "stand by") position for the reverse gear ratio. In this condition, the head portion 110a of the shift arm 110 is received in the recess 88b of the fourth pivoting lever 88. Thus, when then the control rod 94 is axially moved in the leftward direction in FIGS. 5 and 6 in response to a subsequent shifting operation of the manual shift lever, the fourth pivoting lever 88 is rotated about the pin 90 in a clockwise direction in FIG. 6, thereby moving the reverse idler gear 50 from the position (see FIG. 6) indicated by solid line to the position indicated by phantom line. That is, the reverse idler gear 50 is shifted leftward in FIG. 4 to engage with both the reverse input gear 30 and the reverse output gear 48 to establish the reverse condition. (It is to be noted that the gear 50 shown in FIG. 4 is somewhat dislocated from the proper position for clarification of the drawing.)

During this shifting operation, a detent feeling is also given by a fact that the detent ball 96 (see FIG. 6) is forced to move from the notch 94a to the notch 94b against the biasing force of the spring 100.

Even when the operator (driver) intends to carry out the shifting operation with the control rod 94 assuming an angular position other than the above-mentioned predetermined temporary (or "stand by") positions, the shifting is suppressed because in such a condition the stepped recess 106b of the interlock plate 106 fails to align with any of the recesses 82b, 84b, 86b and 88b of the first, second, third and fourth pivoting levers 82, 84, 86 and 88 thereby blocking the movement of these levers 82, 84, 86 and 88 about the pin 90.

The axial movement of the control rod 94 is adjusted by, as is seen from FIG. 6, abutting a shoulder portion 94d of the rod 94 against the downwardly projected portion of the sleeve 98, abutting the shift arm 110 against an edge 92m of the bracket bottom wall 92a, and abutting a flanged end 94e of the rod 94 against the projected portion of the sleeve 98.

DETAILED DESCRIPTION OF THE FIRST EMBODIMENT

Figure 11:
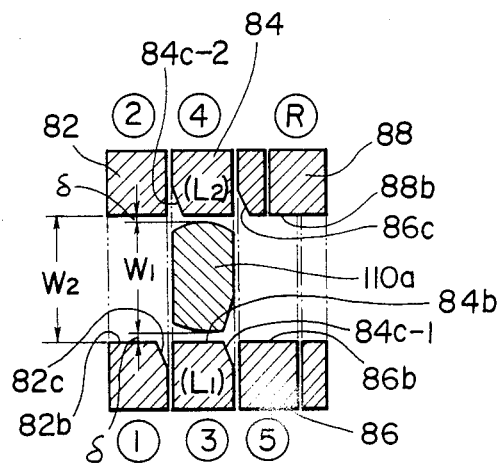
FIG. 11 is a sectional view of a direction changing mechanism employed in the shift control mechanism of the first embodiment of the invention, the view being taken along the line XI—XI of FIG. 6.
Figure 12:
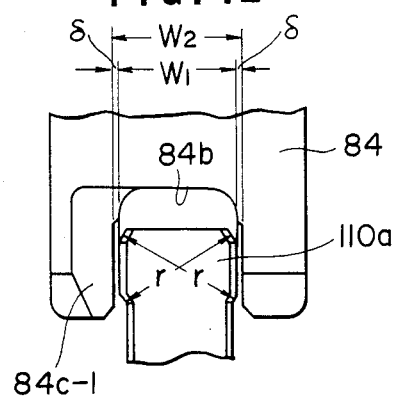
FIG. 12 is a partial enlarged side view of the direction changing mechanism employed in the first embodiment.
Figure 14:
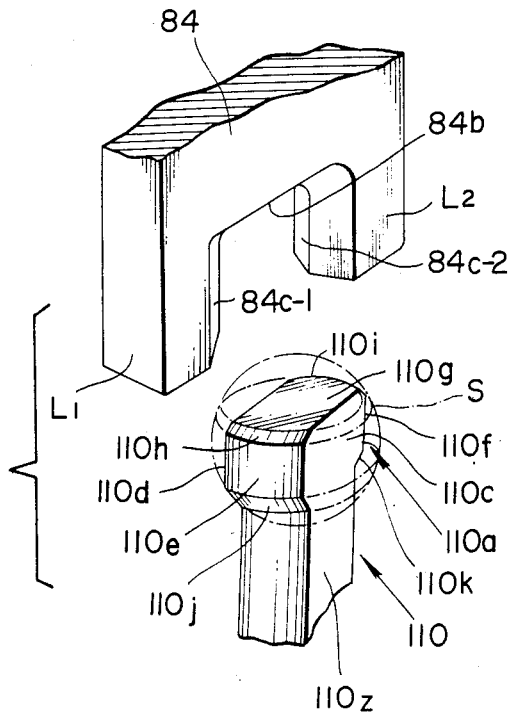
FIG. 14 is a perspective view of the head portion of the shift arm and a recessed end portion of a pivoting lever, which are shown separated.

Referring to FIGS. 11, 12 and 14, there is shown an essential part of the present invention, which is the "direction changing mechanism" comprising the rectangular recess 82b, 84b, 86b or 88b of each pivoting lever 82, 84, 86 or 88 and the head portion 110a of the shift arm 110 which is insertable in the recess in a manner to form articulated connection therebetween.

As is seen from FIGS. 11, 12 and 14, the rectangular recesses 82b, 84b and 86b of the first, second and third pivoting levers 82, 84 and 86 are formed with chamfered portions 82c, 84c-1, 84c-2 and 86c. As is understood from FIG. 11, the chamfered portion 82c of the first pivoting lever 82 is formed on one leg portion against which the head portion 110a of the shift arm 110 abuts when the shifting operation for the first gear ratio is carried out. The portion 82c is located at a side facing the second pivoting lever 84. The chamfered portions 84c-1 and 84c-2 of the second pivoting lever 84 are formed on respective leg portions $L_1$ and $L_2$ (see FIG. 14) against which the head portion 110a abuts respectively when the shifting operations for the third and fourth gear ratios are carried out. The chamfered portion 84c-1 is located at a side facing the third pivoting lever 86, while the chamfered portion 84c-2 is located at a side facing the first pivoting lever 82. The chamfered portion 86c of the third pivoting lever 86 is formed on a leg portion (which has a reduced thickness as is seen from FIG. 11) other than the leg portion against which the head portion 110a of the shift arm 110 abuts when the shifting operation for the fifth gear ratio is carried out. The chamfered portion 86c is located at a side facing the second pivoting lever 84.

Figure 13:
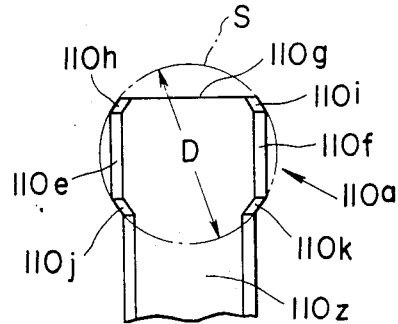
FIG. 13 is an enlarged side view of a head portion of a shift arm of the direction changing mechanism of FIG. 12.

As is seen from FIG. 14, the head portion 110a of the shift arm 110 is somewhat enlarged as compared with the shank portion 110z of the same, and comprises parallel flat side surfaces 110c and 110d, cylindrical front and rear surfaces 110e and 110f and a flat top surface 110g which are arranged to constitute a volminous configuration, as shown. The front and rear cylindrical surfaces 110e and 110f meet the flat top surface 110 at their respective ridge portions 110h and 110i which are spherical in shape, and the front and rear cylindrical surfaces 110e and 110f meet the shank portion 110z at their respective joined portions 110j and 110k which are also spherical in shape. It is to be noted that the four spherical ridge portions 110h, 110i, 110j and 110k constitute part of a common imaginary spherical body S of diameter D (see FIG. 13). It is thus to be noted that distance "r" between the diametrically opposed ridge portions 110h and 110k and that "r" between the other paired portions 110i and 110j are equal to the diameter D of the spherical body S. As is seen from FIG. 11, the thickness of the head portion 110a (that is the distance between the parallel side surfaces 110c and 110d) is substantially equal to the thickness of at least the major portion of each recess 82b, 84b, 86b or 88b. The width $W_2$ of the recess 82b, 84b, 86b or 88b of each pivoting lever 82, 84, 86 or 88 is greater than the width $W_1$ of the head portion 110a of the shift arm 110. It is to be noted that the width $W_2$ of the recess is equal to the aforementioned distance "r" (that is, the diameter D of the spherical body S). Arrangement is so made that under neutral condition of the shift control mechanism (wherein the head portion 110a of the shift arm 110 is received in the recess 84b of the second pivoting lever 84 thereby assuming the "stand by" position for the third or fourth speed gear ratio), the head portion 110a is spacedly put in the recess 84b of the second pivoting lever 84 with equal spaces δ from both leg portions $L_1$ and $L_2$. This arrangement will be well understood from FIGS. 11 and 12.

Figure 16:
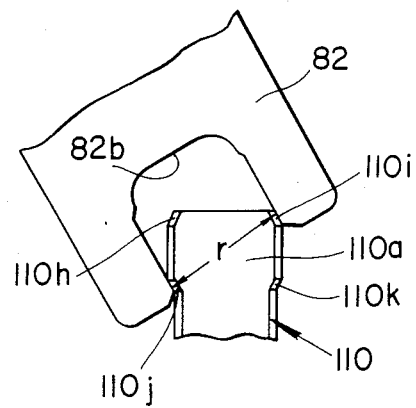
FIG. 16 is a view similar to FIG. 12, but showing a condition wherein a pivoting lever is finally actuated by the head portion of the shift arm.

As is described hereinafore, when the manual shift lever carries out shifting operation after certain selecting operation, the shift arm 110 moves axially in one direction together with the control rod 94 (see FIG. 6) causing the head portion 110a thereof to pivot a selected pivoting lever 82, 84, 86 or 88. FIG. 16 shows such a condition that the head portion 110a of the shift arm 110 completes the pivoting of a selected pivoting lever 82. Under this condition, the diametrically opposed spherical ridge portions 110i and 110j are in intimate contact with the opposed surfaces of the recess 82b, so that the pivoting lever 82 is held without play. Of course, this advantageous phenomenon is equally applied to the other pivoting levers 84, 86 and 88. Thus, dangerous unexpected gear disengagement during driving is assuredly prevented.

The provision of the spaces δ between the head portion 110a and the side walls of the recess 82b 84b, 86b or 88b of the pivoting lever 82, 84, 86 or 88 at the neutral condition of the mechanism assures the following advantage.

That is, with such spaces δ, the shifting movement of the manual shift lever is carried out with a considerable "play". This play is promoted by the provision of the chamfered portions 82c, 84c-1, 84c-2 and 86c of the recesses 82b, 84b and 86b of the pivoting levers 82, 84 and 86. Thus, as is seen from FIG. 15, the path swept out by the manual shift lever during the selecting and shifting operations thereof is described as a largely curved line as indicated by $P_1$. This largely curved shift pattern of the manual shift lever provides the operator (or driver) with a comfortable shift feeling. Actually, the shifting movement of the manual shift lever is smoothly achieved without any shocks. Indicated by broken curved line $P_2$ is a path which is swept out when only the chamfered portions 82c, 84c-1, 84c-2 and 86c are provided.

Additionally, the provision of the spaces δ can block transmission of vibration from the pivoting levers 82, 84, 86 and 88 to the shift arm 110 under neutral condition of the transmission. Thus, the undesirable vibration which would be transmitted to the manual shift lever under engine idling is minimized or at least reduced to a tolerable level.

DESCRIPTION OF THE SECOND EMBODIMENT

Figure 17:
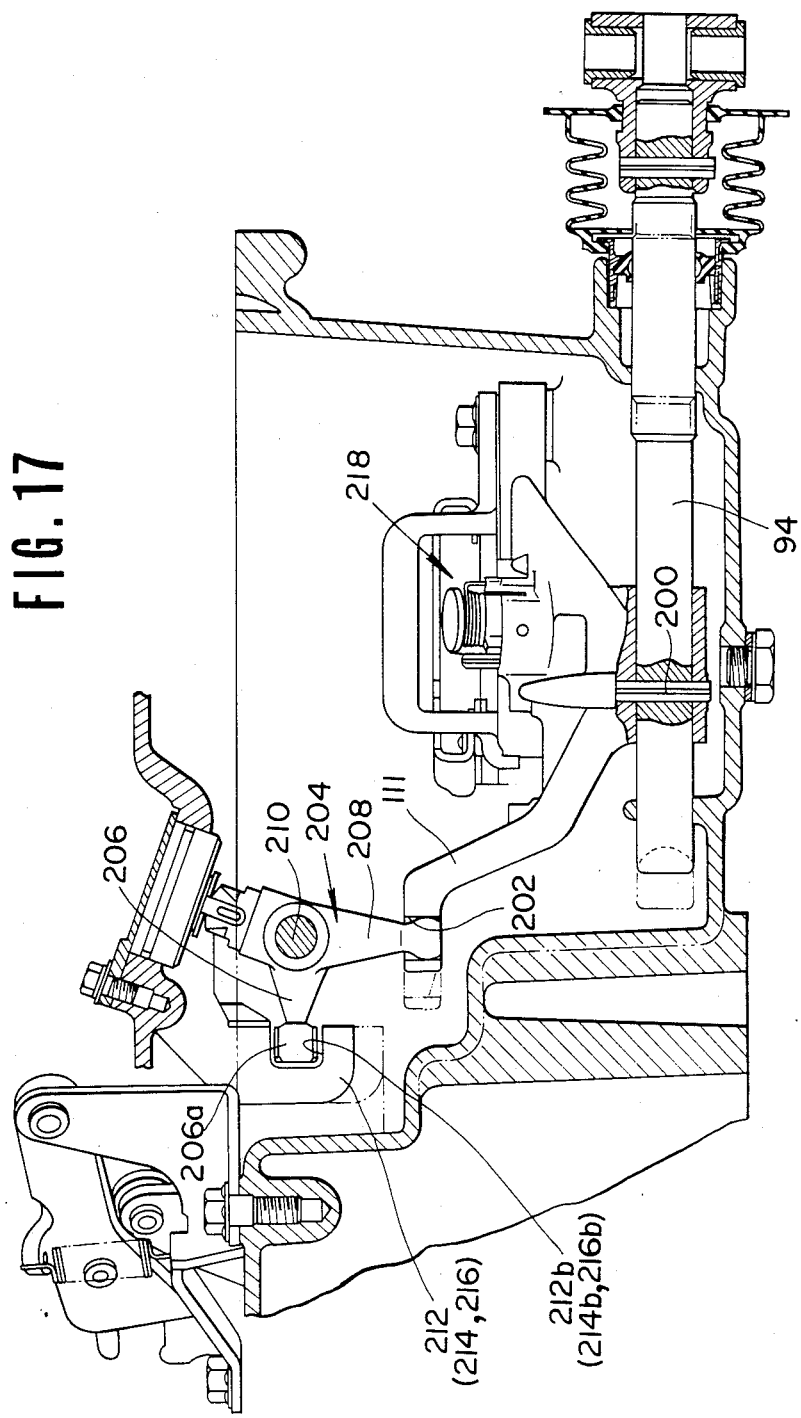
FIG. 17 is a partial, longitudinally sectional view of another manual transmission at the position where a shift control mechanism of a second embodiment of the invention is located.

Referring to FIG. 17, there is shown a shift control mechanism of the second embodiment of the present invention. The direction changing mechanism employed in this second embodiment is of a type which uses only one pivoting lever, as will be described in detail hereinafter in the section of "DETAILED DESCRIPTION OF THE SECOND EMBODIMENT".

The shift control mechanism of this second embodiment comprises a control rod 94 which is connected through a known linkage to the manual shift lever (not shown) located in the vehicle cabin. An elongate shift arm 111 is secured at its one end to the control rod 94 by means of a pin 200, so that the shift arm 111 and the control rod 94 move together. The leading end of the shift arm 111 is formed with a bore 202. A generally L-shaped pivoting lever 204 having first and second arm portions 206 and 208 is slidably and rotatably disposed at its hub portion on a fixed shaft 210 which extends perpendicular to the axis of the control rod 94. The pivoting lever 204 is thus slidable along the shaft 206 and rotatable about the same. The second arm portion 208 has a spherical head portion (no numeral) which is pivotally received in the bore 202 of the shift arm 111 in a manner to form an articulated connection therebetween. Three alinged brackets 212, 214 and 216 are arranged near the pivoting lever 204, each having a rectangular recess 212b, 214b or 216b into which an enlarged head portion 206a of the first arm portion 206 of the pivoting lever 204 is received in a manner as will become apparent as the description proceeds.

The recess 212b, 214b and 216b of the brackets and the head portion 206a of the first arm portion 206 will be described in detail hereinafter in the section of "DETAILED DESCRIPTION OF THE SECOND EMBODIMENT" because they are directly concerned with the present invention.

The three brackets 212, 214 and 216 are respectively secured to three parallel fork rods (not shown) which extend perpendicular to both the control rod 94 and the fixed shaft 210. The fork rods are provided with respective shift forks (not shown) for 1-2 speed change, 3-4 speed change and 5-Reverse speed change. Thus, each bracket 212, 214 or 216, the associated fork rod and the associated shift fork move together as a unit.

Figure 18:
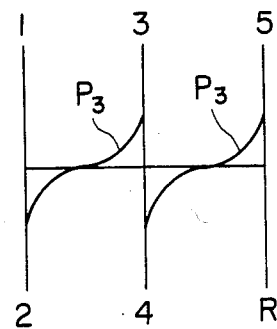
FIG. 18 is a shift pattern described by a manual shift lever incorporated with the shift control mechanism of the second embodiment.

Upon selecting operation of the manual shift lever in the vehicle cabin, the control rod 94 and thus the shift arm 111 are rotated together about the axis of the control rod 94 thereby sliding the pivoting lever 204 along the fixed shaft 210 to a certain position where the head portion 206a of the first arm portion 206 of the pivoting lever 204 is received in one of the recesses 212b, 214b and 216b of the three brackets 212, 214 and 216. Upon shifting operation of the manual shift lever thereafter, the control rod 94 and thus the shift arm 110 move together along the axis of the control rod 94 thereby pivoting the pivoting lever 204 about the shaft 210 in a certain direction. With this movement, the selected bracket 212, 214 or 216 and thus its associated fork rod and shift fork are moved in a certain direction to achieve a desired gear coupling. Unlike the case of the first embodiment mentioned hereinafter, in the second embodiment, the third bracket 216 and its associated fork rod and shift fork serve to achieve both the fifth forward speed ratio and the Reverse condition. That is, as will be understood from the shift pattern shown in FIG. 18, moving the bracket 216 in one direction brings about the fifth forward speed ratio, while, moving the same in the other direction brings about the Reverse condition. Designated by numeral 218 in FIG. 17 is a known check mechanism by which the dangerous direct shift from the fifth speed to the Reverse is prevented.

DETAILED DESCRIPTION OF THE SECOND EMBODIMENT

Figure 19:
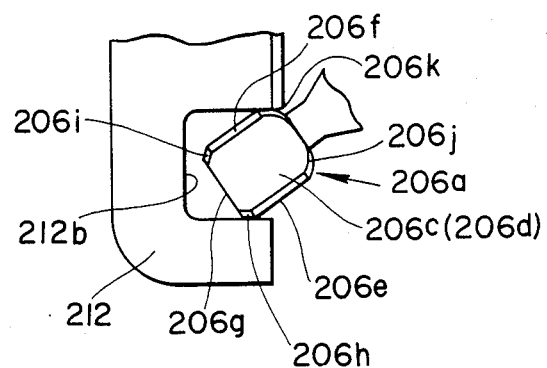
FIG. 19 is a partial, enlarged side view of the direction changing mechanism employed in the second embodiment, showing a condition wherein a single pivoting lever is finally actuated by the head portion of the shift arm.

As is seen from FIG. 19, the "direction changing mechanism" employed in this second embodiment is substantially the same as that of the afore-mentioned first embodiment. However, in this second embodiment, portions corresponding to the chamfered portions on the pivoting levers 82, 84 and 86 of the first embodiment are not provided.

That is, in this second embodiment, the enlarged head portion 206a of the first arm portion 206 of the pivoting lever 204 has substantially the same configration as the head portion 110a of the first embodiment, which thus comprlses parallel flat side surfaces 206c and 206d, cylindrical front and rear surfaces 206e and 206f and a flat top surface 206g. The four ridge portions 206h, 206i, 206j and 206k formed on the head portion 206a constitute part of a common imaginary spherical body. With this configuration of the head portion 206, substantially the same effects as those of the first embodiment are provided as is understood from the curved path P$_3$ (see FIG. 18) swept out by the manual shift lever.

Figure 1:
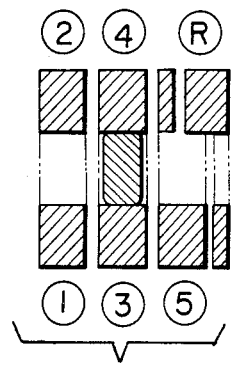
FIG. 1 is a sectional view of a direction changing mechanism employed in a prior art shift control mechanism.
Figure 2:
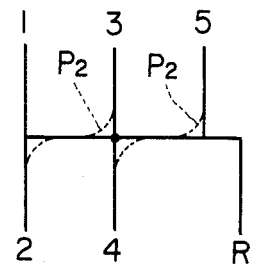
FIG. 2 is a shift pattern described by a manual shift lever incorporated with the direction changing mechanism of FIG. 1.
Figure 3:
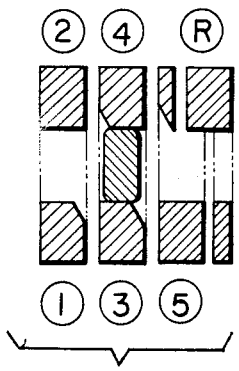
FIG. 3 is a view similar to FIG. 1, but showing somewhat improved direction changing mechanism employed in another prior art shift control mechanims.

The advantageous features of the present invention will be more apparent when compared with the less advantageous features of conventional shift control mechanisms depicted by FIGS. 1 to 3. The known direction changing mechanism shown in FIG. 1 has no portions corresponding to the chamfered portions on the pivoting levers 82, 84 and 86 of the first embodiment, nor head portion like the chacteristic enlarged head portion 110a of the shift arm 110. The path swept out by the manual shift lever associated with this first conventional mechanism is substantially consistent with the rectangular shift pattern of the solid line in FIG. 2. It is known that smooth gear change movement of the manual shift lever is not expected from such rectangular path. The other known direction changing mechanism shown in FIG. 3 has portions corresponding to the chamfered portions on the pivoting levers 82, 84 and 86 of the first embodiment, but not such a head portion as the present invention. The path of the manual shift lever associated with this mechanism is indicated by the broken line P$_2$ which is less curved. The movement of the manual shift lever is somewhat improved as compared with the mechanism of FIG. 1, but has not satisfied the operator (driver).

What is claimed is:

1. In a shift control mechanism of a manual transmission having a control rod which is movable in response to both selecting and shifting operations of a manual shift lever, and at least one shift fork which is movable to achieve a gear coupling, a direction changing mechanism comprising:

a drive member movable together with said control rod, said drive member having an enlarged head portion;

said head portion having two diametrically opposed portions;

a driven member movable together with said shift fork, said driven member being formed with a recess into which said head portion of the drive member is insertable to actuate said driven member, wherein said enlarged head portion and said recess are so sized and constructed that upon said selecting operation, said head portion is brought into said recess maintaining said two diametrically opposed portions spaced from side walls of said recess, and upon completion of said shifting operation, said two diametrically opposed portions of said head portion are in intimate contact with said side walls of said recess.

2. A direction changing mechanism as claimed in claim 1, in which said recess of the driven member is rectangular in shape.

3. A direction changing mechanism as claimed in claim 2, in which said two side walls of the recess are parallel with each other, and in which said diametrically opposed portions constitute part of a common imaginary spherical body, and in which the diameter of said spherical body is equal to the width of the rectangular recess of said driven member.

4. A direction changing mechanism as claimed in claim 3, in which said enlarged head portion comprises parallel flat side surfaces, cylindrical front and rear surfaces and a flat top surface which are arranged to form a boxy configuration, said cylindrical front and rear surfaces facing said parallel side walls of the recess under the rest or neutral condition of said drive member.

5. A direction changing mechanism as claimed in claim 4, in which said front and rear cylindrical surfaces meet said flat top surface at their respective ridge portions which are spherical in shape, and in which said front and rear cylindrical surfaces meet a reduced shank portion of said drive member at their respective joined portions which are spherical in shape, and in which the ridge portions and joined portions constitute part of the common imaginary spherical body.

6. A direction changing mechanism as claimed in claim 5, in which the thickness of said head portion is substantially equal to the thickness of said recess of the driven member.

7. A direction changing mechanism as claimed in claim 6, in which at least one of said side walls of the recess is chamfered to promote smooth movement of said head portion during the selecting and shifting operations.

8. A direction changing mechanism as claimed in claim 1, in which said drive member is secured to said control rod to move therewith, said control rod being rotatable about its axis in response to the selecting operation of the manual shift lever and slidable along the axis in response to the shifting operation of the manual shift lever.

9. A direction changing mechanism as claimed in claim 8, in which said driven member is an arm portion of a generally L-shaped pivoting lever which has another arm portion which forms an articulated connection with an extension of said shift fork, said pivoting lever being pivotable about a fixed pin.

10. A direction changing mechanism as claimed in claim 1, in which said drive member comprises a generally L-shaped pivoting lever which is slidably and rotatably mounted on a fixed shaft which extends perpendicular to an axis of said control rod, an end portion of said drive member forming an articulated connection with a shift arm secured to said control rod.

* * * * *